C. LANZ.
METHOD OF CONSTRUCTING HINGES.
No. 184,249. Patented Nov. 14, 1876.
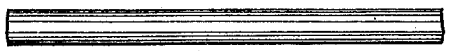
fig 1.
fig 2.
fig 3.
fig 4.
fig 5.
fig 6.
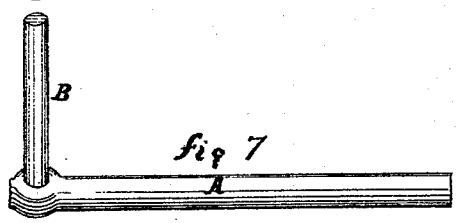
fig 7.
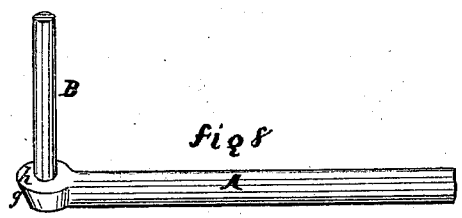
fig 8.
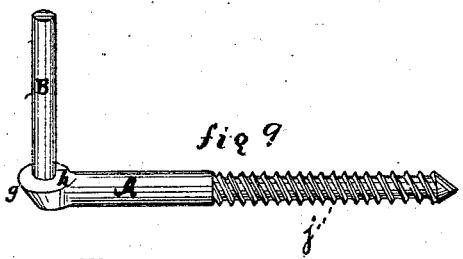
fig 9.
fig 11.
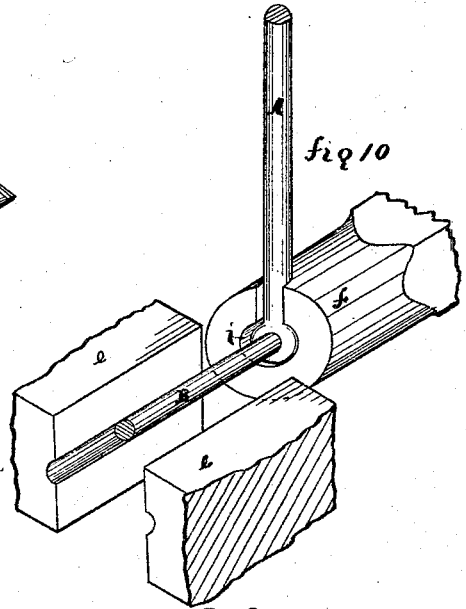
fig 10.
Witnesses
B. L. Johnston
D. J. K. Rine
Inventor
Charles Lanz
By A. C. Johnston
His Attorney.

UNITED STATES PATENT OFFICE

CHARLES LANZ, OF PITTSBURG, PENNSYLVANIA.

IMPROVEMENT IN METHODS OF CONSTRUCTING HINGES.

Specification forming part of Letters Patent No. 184,249, dated November 14, 1876; application filed April 17, 1876.

*To all whom it may concern:*

Be it known that I, CHARLES LANZ, of Pittsburg, county of Allegheny, State of Pennsylvania, have invented a new and useful Improvement in Method of Constructing the Hook Part of Hook-and-Eye Hinges; and I do hereby declare that the following is a full, clear, and exact description thereof, reference being had to the accompanying drawings and to the letters of reference marked thereon.

My invention relates to an improvement in method of constructing the hook part of hook-and-eye hinges; and consists of taking round iron, when viewed in cross-section, of different diameters, in contradistinction to a single piece of said iron, and preparing and welding said pieces together, in the manner hereinafter described.

To enable others skilled in the art to make and use my invention, I will proceed to describe its construction.

In the accompanying drawings, which form part of my specification, Figures 1 and 2 are side views of the two blanks used for forming the hook part of a hook-and-eye hinge. Figs. 3 and 4 are end views of the same. Figs. 5 and 6 are a face view of the shank part, punched or split at its end for the reception of the pintle part. Fig. 7 is the two blanks arranged in juxtaposition prior to being welded. Fig. 8 represents the hook part of the hinge after being welded. Fig. 9 represents the hook part of the hinge when furnished as an article of merchandise. Fig. 10 represents the dies used for grasping and welding the shank and pintle together. Fig. 11 represents a section of the welding and griping dies.

The methods heretofore adopted for the construction of the hook part of hook-and-eye hinges consists in taking a single piece of iron and bending a portion of it at right angles, and then, by means of suitable dies, forming a seat for the eye part of the hinge to rest upon. Another method consists in taking two pieces of iron of different diameters, and drawing out the end of the piece which forms the shank of the hinge, and then bending it over the piece which is to form the pintle, then heating and welding the parts together by means of a hammer and swaging-dies.

My method of forming the hook part of hook and eye hinges consists in taking two pieces of iron of different diameters, as shown in Figs. 1 and 2, and punching or splitting the piece A, as shown in Figs. 5 and 6, respectively, and then inserting the part B, which forms the pintle, in the opening C of the part A, as shown in Fig. 7, and then heating them at the point of union to a welding-heat, then placing the pintle B in the griping-dies $e$, as shown in Fig. 10. The welding-die $f$, then acting upon the enlargement $g$ at the point of union, welds the parts together, forming the seat $h$ for eye part of the hinge to rest upon. The contour at the point of union between the parts A and B of the hook part of the hinge will depend upon the form of the recess $i$ in the welding-die $f$.

The dies $e$ and $f$ are placed in a machine constructed substantially as the ordinary bolt-heading machine, said dies operating with relation to each other, substantially in the same manner as the griping and heading die of such machine. The hook part of the hinge is finished and furnished with screw-threads, as indicated at $j$, as shown in Fig. 9. It is then ready as an article of merchandise.

By constructing the hook part of hook-and-eye hinges by the method hereinbefore described, they can be manufactured cheaply and with great facility, having the pintle of less diameter than the shank, thereby economizing material and having the desired strength in the shank.

When the hinge is constructed of a single piece of iron the shank A and pintle B is always of the same diameter, and when the shank is furnished with screw-threads, as hereinbefore described, its diameter between the threads is greatly reduced, thereby diminishing the strength of the shank, which is a very objectionable feature to the hook part of a hook-and-eye hinge, which objection is obviated by constructing the hook part of the hinge of two pieces of iron of different diameters in contradistinction to a single piece of iron by the method hereinbefore described.

Having thus described the nature and construction of my improvement, what I claim as of my invention is—

The method hereinbefore described for constructing the hook part of a hook-and-eye hinge.

CHARLES LANZ.

Witnesses:
A. C. JOHNSTON,
D. I. K. RINE.